July 17, 1934.   J. J. PUNKE   1,966,968
VEHICLE BODY CONSTRUCTION
Filed Dec. 4, 1933   2 Sheets-Sheet 1
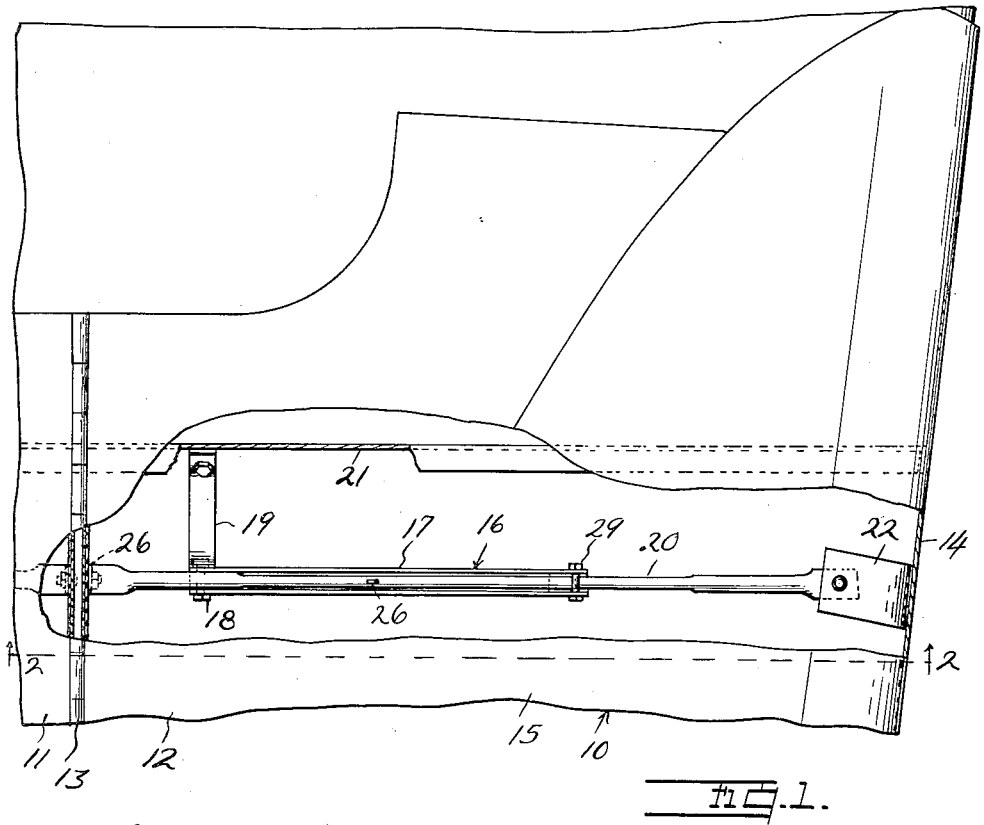
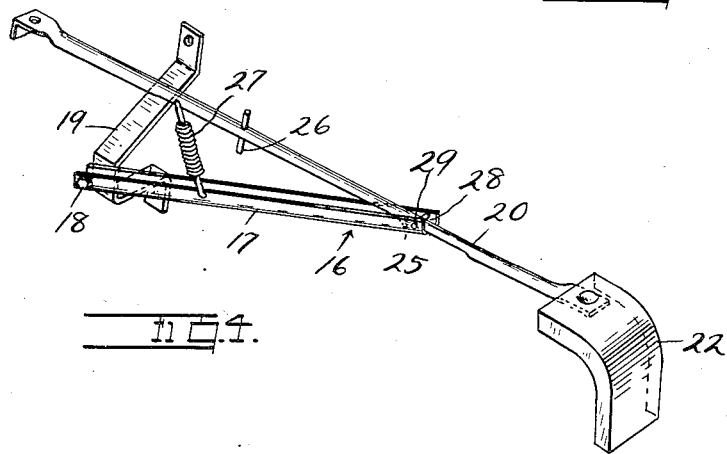
INVENTOR
John J. Punke
BY Whittemore Hulbert
Whittemore + Belknap
ATTORNEY

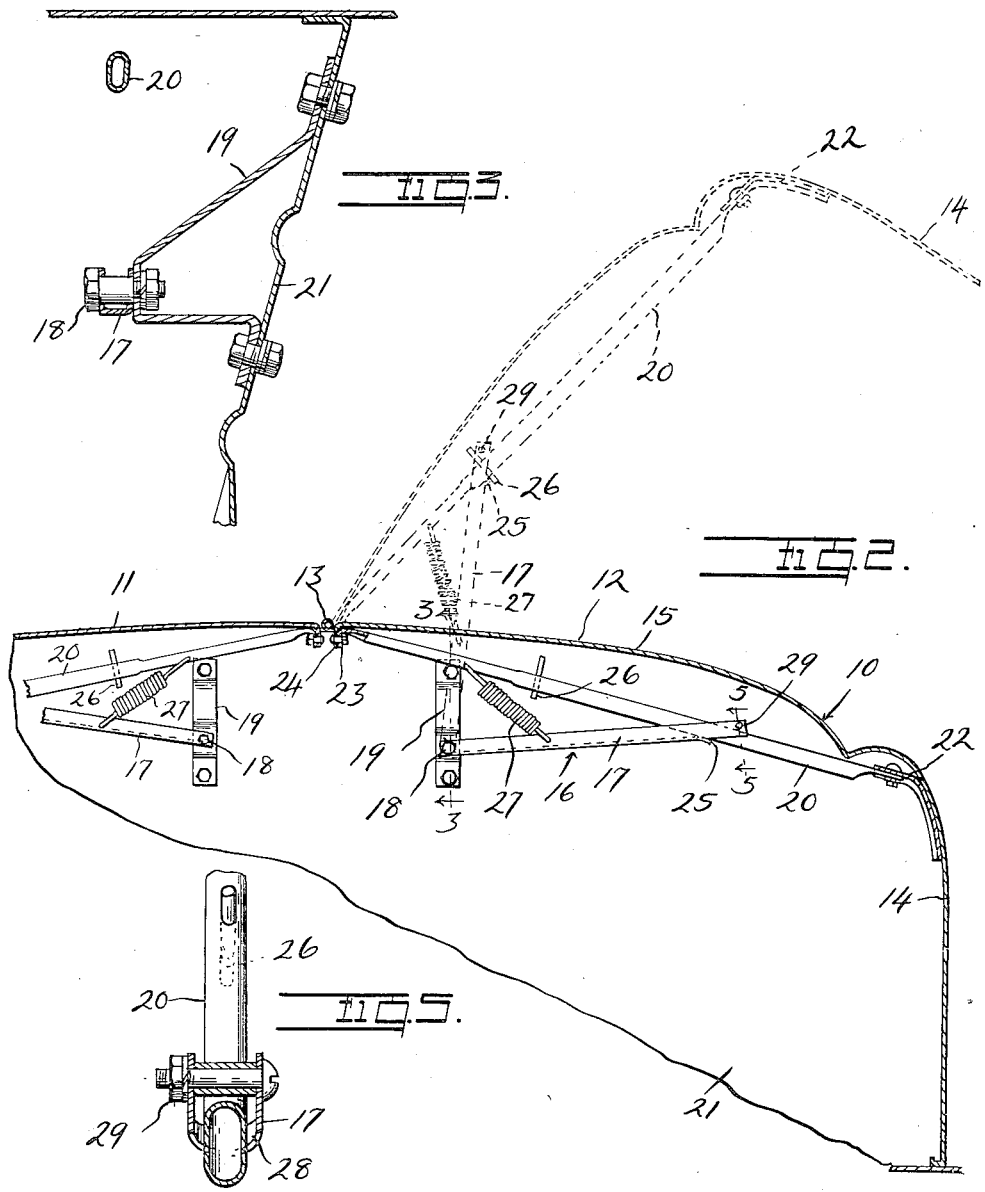

Patented July 17, 1934

1,966,968

UNITED STATES PATENT OFFICE 1,966,968

VEHICLE BODY CONSTRUCTION

John J. Funke, Detroit, Mich., assignor to Hupp Motor Car Corporation, Detroit, Mich., a corporation of Virginia Application December 4, 1933, Serial No. 700,907

4 Claims. (Cl. 180—69)

This invention relates to motor vehicles and refers more particularly to improved means for holding the hood of the engine compartment of the vehicle in its raised position.

One of the principal objects of this invention is to provide relatively simple and inexpensive means readily attachable to any one of a variety of different types of hoods for positively holding the latter in its raised position wherein access may be had to the interior of the engine compartment of the vehicle.

More specifically, this invention contemplates the provision of means of the character set forth in the form of a latch automatically operable in dependence upon raising the hood to a predetermined position to hold the latter in this position.

A further advantageous feature of this invention resides in the provision of latch mechanism of the type specified applicable to hood constructions of the character having complementary relatively movable side portions for holding either of said sides in their raised positions.

The foregoing, as well as other objects will be made apparent as this description proceeds, especially when considered in connection with the accompanying drawings, wherein;

Figure 1 is a top plan view of a portion of a hood having parts broken away to illustrate my improved latch mechanism;

Figure 2 is a cross sectional view taken substantially on the plane indicated by the line 2—2 of Figure 1;

Figure 3 is a sectional view taken substantially on the line 3—3 of Figure 2;

Figure 4 is a perspective view of a latch mechanism forming the subject matter of this invention;

Figure 5 is a sectional view taken on the line 5—5 of Figure 2;

Referring now more in detail to the drawings, it will be noted that there is illustrated in Figure 1, a portion of a motor vehicle hood 10 formed of complementary sections 11 and 12 hingedly connected together at the longitudinal medium line of the motor vehicle through the medium of a suitable hinge 13. The construction is such as to permit raising either or both of the complementary sections 11 and 12 when it is desired to gain access to the interior of the engine compartment of the vehicle normally concealed by the hood.

Although the latch mechanism about to be described is applicable to various different types of hood constructions, nevertheless, it finds particular utility when employed in association with hoods of the type briefly referred to above, wherein the side walls 14 bear a fixed relationship to the top walls 15. In constructions of this character the side walls 14 of the hood do not swing inwardly upon raising the hood, and as a consequence are of no utility in supporting the hood in its raised position. In order to permit the use of hoods of the general design specified and at the same time afford means for supporting either section of the hood in its raised position, I provide latch means automatically operable in dependence upon raising either or both sides of the hood for positively holding the latter sides in their raised positions. In the specific embodiment of the invention two separate latch mechanisms are shown for accomplishing the function previously discussed and since both of these mechanisms are identical in construction, only one will be described in detail. The latch mechanism is designated generally by the reference character 16 and comprises a brace 17 having the inner end pivotally supported as at 18 upon a suitable bracket 19 and having the outer end slidably engaging a rail or guide 20. In the present instance, the rail is fixedly secured to the section 12 of the hood and the bracket 19 is fixedly secured to the dash 21 of the motor vehicle at a point adjacent to but spaced outwardly from the hinge connection 13 between the complementary hood parts. In detail the outer end of the rail 20 is secured to the side wall 14 of the hood section 12 through the medium of a bracket 22 and the inner end of the rail is fixedly secured as at 23 to a flange 24 extending downwardly from the top wall 15 of the hood section 12 immediately adjacent the hinge 13.

As shown particularly in Figure 2, the inner end of the member 17 is pivotally connected to the bracket 19 at a point spaced below the guide rail 20 and since the outer end of the member 17 slidably engages the guide rail, it necessarily follows that the member 17 assumes a bracing position with reference to the guide rail upon raising the section 12 of the hood. In order to positively hold the section 12 in the raised position thereof illustrated by the dotted lines in Figure 2, cooperating engaging shoulders 25 and 26 are respectively formed on the brace and guide rail. The arrangement is such that the shoulder 25 rides over the shoulder 26 and engages behind the latter when the hood section 12 is raised to the aforesaid dotted line position so as to prevent slipping of the brace relative to the guide rail. In order to insure engagement of the shoulder 25 behind the shoulder 26 after the former passes over the latter, a suitable spring 27 is provided having one end secured to the brace intermediate the ends thereof and having the other end secured to the guide rail.

Referring more in detail to the particular construction of the brace and guide rail, it is to be noted that the latter is substantially tubular in cross section throughout the major portion of its length, while the former is substantially channel shaped in cross section with the result that the latch mechanism is not only of minimum weight but possesses considerable strength. The slidable connection between the outer end of the brace and guide rail is accomplished, in the present instance, by notching the outer end of the base portion of the rail to form a slot 28 permitting the guide rail to be extended between the legs of the channel. Although the spring 27 functions to maintain the outer edge of the base portion of the brace in frictional contact with the under side of the guide rail, nevertheless, means is provided for holding the brace in assembled relation with the rail and this means comprises a bolt 29 extending through the opposite sides of the channel at the outer ends thereof and above the guide rail 20. The construction is such that the bolt cooperates with the outer edge of the base portion of the channel shaped brace to hold the latter in assembled relation with the guide rail. In this connection, it is to be noted that the shoulder 25 on the brace is formed by displacing the outer edge of the base portion of the channel shaped brace downwardly while the shoulder 26 on the guide rail is formed by a pin extending transversely through the rail at a point predetermined in dependence upon the desired elevation of the section 12 of the hood. In this connection, it is to be noted that the pin extends a substantial distance above the guide rail and this portion of the pin cooperates with the bolt 29 to limit raising of the section 12 beyond the point required for engagement of the cooperating shoulders.

As previously stated, a latch device of the type just described is associated with each of the sections of the hood so that upon raising either or both of the sections the latch devices operate automatically to hold the sections in their raised positions. Assuming that the section 12 is in its raised position shown by the dotted line in Figure 2 and that it is desired to lower this section to its normal operative position the operator merely grasps the usual handle (not shown) on the side wall 14 of the hood with one hand and effects an outward movement of the free end of the brace 17 with the other hand to release the shoulder 25 from engagement behind the shoulder 26. Upon disengagement of the cooperating shoulders referred to above, the hood may be lowered to its normal operative position in the usual manner without interference by the latch mechanism. It will, of course, be understood that while the bolt 29 serves to hold the brace 17 in assembled relation with the guide 20, the same is spaced a sufficient distance from the shoulder 25 to permit the movement of the latter required to release the same from engagement with the shoulder 26.

What I claim as my invention is

1. In a motor vehicle, a hood having a section movable from closed to open position, a guide rail carried by the section, a brace having one end pivotally supported by a part fixed relative to the section and having the other end slidably engaging the guide rail, a shoulder on said rail, a cooperating shoulder on the last named end of the brace movable over the shoulder aforesaid upon raising the section to a predetermined open position and engageable with the latter shoulder to hold said section in said predetermined position, and yieldable means normally urging said shoulders into engagement.

2. In a motor vehicle, a hood having a section movable from closed to open position, a guide rail carried by the section, a brace having one end pivotally supported by a part fixed relative to the section and having the other end slidably engaging the guide rail, a shoulder on said rail having portions projecting from opposite sides of the rail, a cooperating shoulder on the last named end of the brace movable over one of said portions upon raising the section to a predetermined open position and engageable with the latter portion to hold said section in the predetermined position aforesaid, and means carried by the brace engageable with the other of said shoulder portions for limiting raising of said section beyond said predetermined position.

3. In a motor vehicle a hood having a section movable from closed to open position, a guide rail carried by the section, a brace having one end pivotally supported by a part fixed relative to the section and having the other end slidably engaging the guide rail, a shoulder on said rail having portions projecting from opposite sides of the rail, a cooperating shoulder on the last named end of the brace movable over one of said portions upon raising the section to a predetermined open position and engageable with the latter portion to hold said section in the predetermined position aforesaid, and means for holding the brace in assembled relation with the rail, said means also operable to engage the other of said shoulder portions on the rail for limiting raising of said section beyond said predetermined position.

4. In a motor vehicle, a hood having a section movable from closed to open position, a guide member carried by the section and having shoulders thereon, a brace having one end pivotally supported by a part fixed relative to the section and having the other end slidably engaging the guide member, a shoulder on the brace movable over one of the shoulders on the guide member upon raising the section to a predetermined open position and engageable with the latter shoulder to hold the section in said open position, and means carried by the brace engageable with the other of said shoulders on the guide member for limiting raising of the section beyond said predetermined open position thereof.

JOHN J. PUNKE.